US008959650B1

(12) United States Patent
Richards et al.

(10) Patent No.: US 8,959,650 B1
(45) Date of Patent: Feb. 17, 2015

(54) VALIDATING ASSOCIATION OF CLIENT DEVICES WITH SESSIONS

(75) Inventors: Gareth D. Richards, Woodstock (GB); Yedidya Dotan, Newton, MA (US); Riaz Zolfonoon, Concord, MA (US); Gregory Dicovitsky, Andover, MA (US)

(73) Assignee: EMC Corporation, Hopkinton, MA (US)

( * ) Notice: Subject to any disclaimer, the term of this patent is extended or adjusted under 35 U.S.C. 154(b) by 43 days.

(21) Appl. No.: 13/537,539

(22) Filed: Jun. 29, 2012

(51) Int. Cl.
*G06F 21/00* (2013.01)
(52) U.S. Cl.
USPC ...... 726/26; 726/8; 726/9; 713/153; 713/167; 709/227
(58) Field of Classification Search
CPC ........................................................ G06F 21/32
USPC ........................................................ 726/23, 26
See application file for complete search history.

(56) References Cited

U.S. PATENT DOCUMENTS

| | | | | |
|---|---|---|---|---|
| 7,966,657 | B2* | 6/2011 | Hofheinz et al. | 726/17 |
| 8,621,590 | B2* | 12/2013 | Hoggan | 726/8 |
| 2006/0174327 | A1* | 8/2006 | Song et al. | 726/3 |
| 2007/0025265 | A1* | 2/2007 | Porras et al. | 370/252 |
| 2007/0136573 | A1* | 6/2007 | Steinberg | 713/155 |
| 2009/0055912 | A1* | 2/2009 | Choi et al. | 726/6 |
| 2009/0138948 | A1* | 5/2009 | Calamera et al. | 726/6 |
| 2009/0254416 | A1* | 10/2009 | Nomula | 705/10 |
| 2010/0199276 | A1* | 8/2010 | Umbehocker | 718/1 |
| 2011/0296125 | A1* | 12/2011 | Shaikh et al. | 711/159 |
| 2012/0011568 | A1* | 1/2012 | Tahan | 726/4 |
| 2012/0174223 | A1* | 7/2012 | Eisen | 726/23 |
| 2012/0210413 | A1* | 8/2012 | Akula et al. | 726/8 |
| 2013/0204690 | A1* | 8/2013 | Liebmann | 705/14.26 |

* cited by examiner

*Primary Examiner* — Morshed Mehedi
(74) *Attorney, Agent, or Firm* — Deepika Bhayana; Jason A. Reyes; Krishnendu Gupta

(57) ABSTRACT

A method is used in validating association of client devices with sessions. Information of a client device executing a user agent is gathered by a server for creating a device identifier for the client device upon receiving a request from the user agent for establishing a session between the user agent and the server. The device identifier includes information identifying the client device. The device identifier is associated with the session. The client device is validated by the server upon receiving subsequent requests from the client device during the session. Validating the client device includes gathering information of the client device sending each subsequent request for creating a device identifier for the client device and comparing the device identifier created from the information gathered during each subsequent request with the device identifier associated with the session.

18 Claims, 4 Drawing Sheets

VALIDATING ASSOCIATION OF CLIENT DEVICES WITH SESSIONS

BACKGROUND

1. Technical Field

This application relates to validating association of client devices with sessions.

2. Description of Related Art

Computer networks, and in particular Wide Area Networks (WANs) such as the Internet, provide opportunities for the misuse and abuse of communications traveling over the network. For example, two users (e.g., a human user and an enterprise server) communicating via the WAN may have their communications intercepted and/or altered. Also, it is possible for one user to misrepresent his, her, or its identity to another user.

Malicious software (malware) is designed to harm or access a computer system without the informed consent of the owner. Malware is a serious threat to many computer systems, particularly in an online environment. Malware includes computer viruses, Trojan horses, worms and other malicious and unwanted software programs. Trojan horses, for example, install themselves on user machines without being perceived by the user. Trojan horses may then enable a controller to record data from an infected machine (e.g., key loggers), listen in on conversations (e.g., Man in The Middle or MiTM), or even hijack an HTTP session from within a browser (e.g., Man in The Browser or MiTB).

Thus, there is a need for both privacy and authentication between users of the network communicating with one another. In other words, users should be able to rely on the fact that their transmissions will not be intercepted or altered, and that transmissions from someone purporting to be a particular user do in fact originate from that user.

A typical internet or intranet web site must often evaluate whether a user should be granted access to a specific resource, or if the user should be allowed to perform a specific transaction. That decision is sometimes delegated to an authorization authority (such as RSA Access Manager product), or some other policy decision point. The policy decision point may include a number of factors in its authorization decision, and usually references a dedicated, locally maintained policy database of user, role, attribute, or permission data.

Uses for the Internet and the World Wide Web are continually increasing, and have expanded into "secure" areas. In web-based systems, such as electronic commerce systems, when data is requested by a client from a server, it is often the case that the web server must query a database to locate the requested data. In such a case, communications between a server and a web browser client typically require authorization of the client, to permit a client access only to certain data stored by the server. Such data may include, for example, contract information or pricing information which is exclusive to that client; other clients of the web server are not entitled to view this information.

Further, as the size and diversity of the Internet grows, so do the devices and applications that use the network. Originally, network applications such as web browsers, terminal clients, and e-mail readers were the only programs accessing the Internet. Now, almost every new device or application has a networking component, whether it is to obtain content, updates, manage licensing, or report usage statistics.

SUMMARY OF THE INVENTION

A method is used in validating association of client devices with sessions. Information of a client device executing a user agent is gathered by a server for creating a device identifier for the client device upon receiving a request from the user agent for establishing a session between the user agent and the server. The device identifier includes information identifying the client device. The device identifier is associated with the session. The client device is validated by the server upon receiving subsequent requests from the client device during the session. Validating the client device includes gathering information of the client device sending each subsequent request for creating a device identifier for the client device and comparing the device identifier created from the information gathered during each subsequent request with the device identifier associated with the session.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
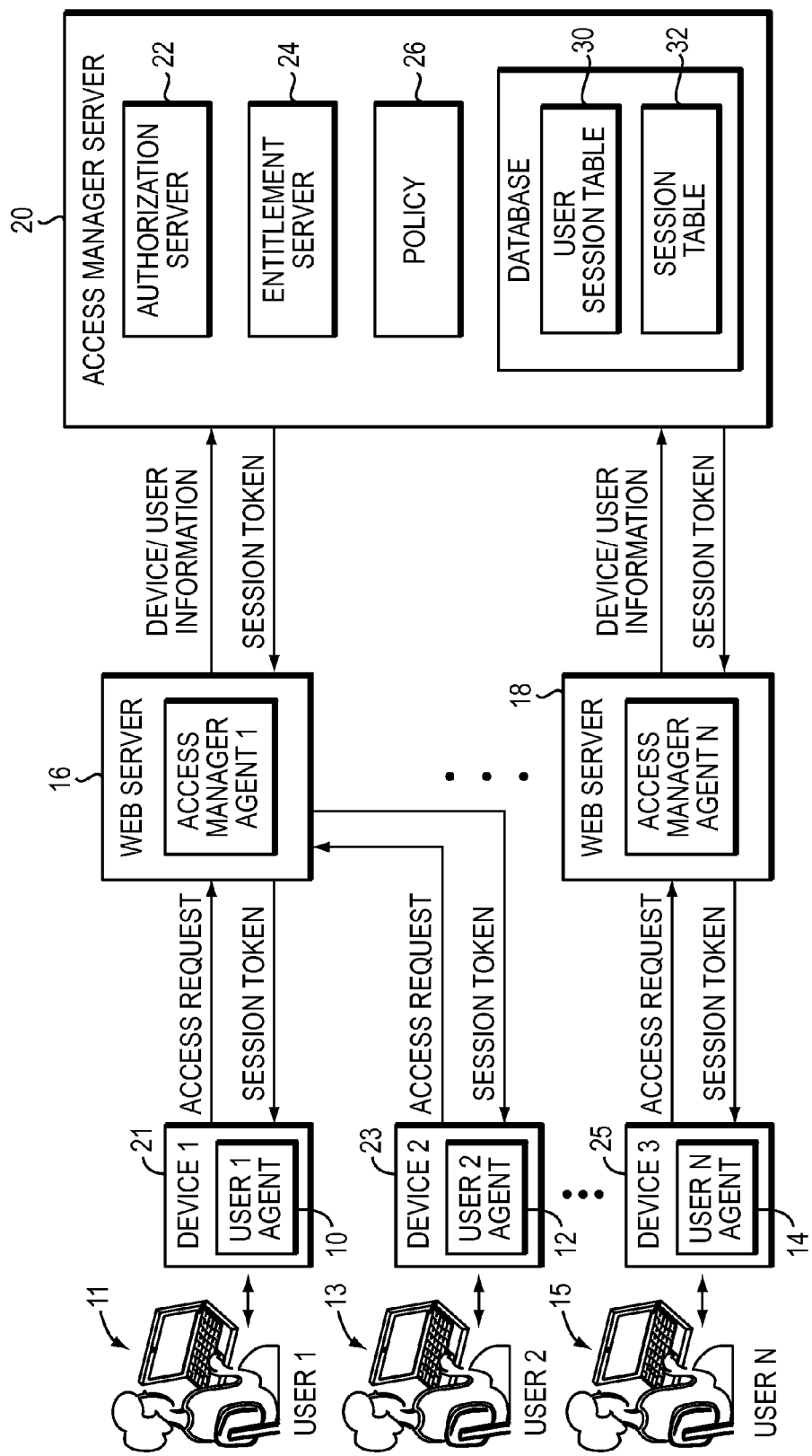
FIG. 1 is an example of an embodiment of a computer system that may utilize the techniques described herein.

Described below is a technique for use in validating association of client devices with sessions, which technique may be used to provide, among other things, gathering information of a client device executing a user agent, by a server, for creating a device identifier for the client device upon receiving a request from the user agent for establishing a session between the user agent and the server, where the device identifier includes information identifying the client device, associating the device identifier with the session, and validating the client device upon receiving subsequent requests from the client device, by the server, during the session, where validating the client device includes gathering information of the client device sending each subsequent request for creating a device identifier for the client device and comparing the device identifier created from the information gathered during each subsequent request with the device identifier associated with the session.

Conventionally, computer systems generally employ a variety of security-related functions for protection against potentially harmful user activity. For example, user authentication is often employed which requires a user to provide a password or other credentials which establishes the user's identity and protects against the possibility of an intruder or fraudster masquerading as an authorized user and engaging in harmful activity. Another type of function, referred to as access control, enforces limitations on the activities that authorized users can engage in. In one common example, access controls may be placed on certain storage devices or file system directories so that only certain users are permitted to access the data therein. Such access controls can serve to protect sensitive data from being accidentally deleted or used for an improper purpose by a user who has no legitimate need for access to the data.

Generally, any one of the known adaptive authentication techniques may be utilized for authenticating a client in order to establish a session (e.g. trusted session) between the client and a server. When the client is successfully authenticated, credentials are generated and distributed to the client. The credentials are required by the client to properly establish sessions to an environment provided by the server. An application such as a web browser invokes a client application on the client in response to receipt of the credential and, in at least some embodiments, passes the credential on to the server which then verifies the credential before allowing a trusted session to be formed between the client application and the server. Further, a server may impose a time limit on validity of the credentials and thus a time limit on the trusted session.

Generally, clients and servers on a network send information to each other as part of a communication session. Data for a communication session is broken up into smaller pieces by the network and transferred from a source system to a destination system. Each of the smaller pieces is governed by a set of rules that defines structure of each smaller pieces based on a communication protocol. For example, the World Wide Web has a standard protocol, the Hyper Text Transport Protocol (HTTP), as defined in Internet Engineering Task Force (IETF), Request For Comments (RFC) 6265, 2011. HTTP protocol specifies how data is transferred from a client to a server, how data is presented to web servers, and how the web servers return data to client web browsers. However, it should be noted that a client may communicate with a server using any one of the known communication protocols.

Further, HTTP information exchanged between a client web browser and a server system may include an HTTP cookie which includes information of a session such as state of the session and a unique session identifier (also referred to herein as "session ID"). Session identifiers are used in managing sessions between a client and a server when a stateless protocol such as HTTP is used between the client and the server.

A session management is a process of keeping track of activities of a user across sessions of interaction with a server. A client may communicate with a server using any one of the known communication protocols such as Hypertext Transfer Protocol (HTTP). HTTP is a stateless communication protocol in which a client system running a web browser must establish a new Transmission Control Protocol (TCP) network connection to a web server with each new HTTP request. Session information for a session includes the state of the session and is stored on a web server using a session identifier (also referred to herein as "session ID") which is generated as a result of a first (sometimes a first authenticated) request issued from a user running a web browser. For example, once a user has been authenticated to a web server, subsequent requests sent to the web server does not require the user to provide credential information such as user's account and password again.

One approach to identifying a client device used by a client to a server is to initially authenticate the client and to then provide a session identifier to the client device in the form of a hypertext transfer protocol (HTTP) cookie. A cookie, which is a form of persistent state object, is data generated by a server that is provided to a client device executing a user agent such that the client device provides the cookie to the server with each subsequent request sent to the server. Further, a session token is a bearer token (also referred to herein simply as "token") that is generated by a server (e.g., authentication server, access manager server) upon a successful authentication of a client using a client device which is in communication with the server.

A bearer token is an authentication token which is provided by a server to a client upon successful authentication of the client. Generally, any client in possession of a bearer token (a "bearer") may use the bearer token to get access to associated resources of a server.

Data and cookies that are transmitted between a server and a client are subject to certain security risks unless measures are taken to secure communications between the client and server. An unauthorized user at a routing point or at another server may capture the packets of data transmitted between a client and a server and read the data contained in a cookie that is transmitted between the client and the server. Alternatively, a user may edit contents of an authorized cookie associated with the user and alter session data contained therein to construct a fraudulent session. For example, if session data includes a contract identification number, a user may edit a cookie to insert a different number and thereby gain access to unauthorized data or resources when the edited cookie is transmitted to a server in a subsequent request. An unauthorized user (also referred to herein as "attacker") may furthermore "steal" a valid cookie from an authorized user, and use the stolen cookie to communicate with a server via a valid session, thereby gaining unauthorized access to the server. Such a scenario is referred to as a session replay attack scenario. Further, an unauthorized user may obtain a session token of an authorized user and use that session token to impersonate the user. Such a scenario is referred to as a session hijacking attack scenario.

Conventionally, even though a bearer token such as a HTTP cookie may include information regarding a client, host or device used by the client, however the bearer token does not provide a mechanism such that a server receiving the bearer token can verify that the client providing the bearer token is the same as the client that has been authenticated by the server, which in turns makes the client susceptible to a session-hijack attack in which an unauthorized user (e.g. attacker) obtains the bearer token of the client and uses that token to impersonate the client. A phishing attack generally involves an attacker or fraudster fooling a user to exchange secret data such as log-on details. The attacker, a man-in-the-middle, uses transmitted authentication data thereafter or simultaneously to affect a log-on procedure under the identity of the attacked authorized user and misuse rights of the user. Thus, in such a conventional system, it is difficult or impossible to validate that a client providing a token to a server during a session is same as the client for which the token has been generated.

In a conventional system, one of the mechanisms used to verify integrity of a token used in a session between a client and server is by associating an IP (Internet Protocol) address of the client with the token, storing the IP address in the token, and comparing the IP address of a host that sends a subsequent request during the session with the IP address stored in the token. However, in such a conventional system, an unauthorized user may gain access to a session by spoofing IP address of an authorized client by creating Internet Protocol (IP) packets with a forged source IP address, also referred to as a spoofing, with the purpose of concealing the identity of a sender or impersonating another computing system. Further, in such a conventional system, the mechanism of associating an IP address with a token fails to work in an environment in which two or more clients share the same IP address. Further, conventionally, a second mechanism used to verify integrity of a session between a client and a server is by using a secure communication protocol such as SSL ("Secure Sockets Layer") between the client and the server. However, in such a conventional system, SSL protocol is used with HTTP cookies and in a system that marks a HTTP cookie in such a way that the HTTP cookie is only provided to a server that is using SSL protocol. Further, in such a conventional case, the mechanism of using SSL protocol does not protect a system from a cross-site scripting attack. A cross-site scripting attack uses vulnerabilities of a web application that enables attackers to bypass client-side security mechanisms generally imposed on web content by web browsers. As a result, attackers inject a malicious client-side script into a web page viewed by other users, and may gain access privileges to sensitive page content, session cookies, and a variety of other information maintained by a browser on behalf of a user. Further, in such a conventional system, by using the mechanism of a secure communication protocol such as SSL, HTTP cookies may only be configured for HTTP communication protocol indicating that a user agent may enable access to the HTTP cookies only to the HTTP communication protocol.

By contrast, in at least some implementations in accordance with the current technique as described herein, using an identifier such as a device fingerprint that identifies a client device and associating the identifier with a session established between a user agent executing on the client device used by a client and a server enables a token used during the session to be uniquely associated with a specific client device. Thus, in at least some implementations in accordance with the current technique as described herein, information identifying a client device (e.g., device fingerprint) is obtained by a server from the client device when a token is first generated for a client using the client device. Generally, a token is generated when a client is authenticated by using any one of the known authentication techniques. Further, in at least some implementations in accordance with the current technique, information identifying a client device is associated with a session upon successful authentication of a client using the client device. In at least one embodiment of the current technique, information identifying a client device may be associated with a session token used for managing a session. Further, in at least some implementations in accordance with the current technique as described herein, when a token provided to a client device is subsequently provided to a server by a user agent executing on the client device during a session, the server obtains identifying information of the client device from the user agent providing the token, and compares the identifying information obtained from the user agent with identifying information previously associated with the session. In such a case, if the identifying information obtained from the user agent matches the identifying information associated with the session indicating that the session token has been provided by the same client that has been authenticated by the server, the session token is accepted by the server. However, if the identifying information obtained from a user agent executing on a client device used by the client does not match with the identifying information previously associated with the session indicating that the user agent executing on the client device subsequently providing the session token is not same as the client device for which the session token has been created by the server, the session token is rejected by the server. Thus, in at least one embodiment of the current technique, a device fingerprint of a client device used by a user is associated with a HTTP cookie or session token generated for the client device such that device fingerprint information is evaluated each time the HTTP cookie or session token is provided to the server by the client device during a session which in turns enables the server to identify a scenario in which a session token (e.g., HTTP cookie) is provided by a client device other than the client device for which the session token (e.g., HTTP cookie) has been generated thereby protecting the server against security attacks such as cross-site scripting and session hijack attacks.

In at least one embodiment of the current technique, one mechanism for associating a client device with a session includes associating the client device with a session identifier (referred to herein as "session token") by embedding identifying information of the client device such as device fingerprint in the session identifier. Further, in at least one embodiment of the current technique, a second mechanism for associating a client device with a session includes embedding a hash value representing identifying information of the client device such as device fingerprint in a session identifier that represents the session. Further, in at least one embodiment of the current technique, a third mechanism for associating a client device with a session includes encrypting identifying information of the client device such as device fingerprint and embedding the encrypted information in a session identifier that represents the session.

In at least some implementations in accordance with the technique as described herein, use of validating association of client devices with sessions can provide one or more of the following advantages: detecting a security risk by performing a comparison of information identifying a client each time the client sends a token to a server during a session established between the client and the server, and preventing a cross-site scripting attack by associating information identifying a client device with a session token that is used for communication with a server during a session established between the client and the server.

Referring now to FIG. 1, shown is an example of an embodiment of a computer system that may be used in connection with performing the technique or techniques described herein. A network environment includes a network (such as, for example, the Internet), a set of client devices (e.g., 21, 23, 25) that are connected to the network. A user of a client device may hold a token device. A network also connects to one or more servers (e.g., 16, 18), and optionally an access server 20. A client device may be, for example, a personal computer having a display monitor. A browser application (also referred to herein as "user agent") runs on a client device which may be displayed on the monitor. A client device connects to a server such as a web server by way of a network connection. A network connection may be a direct connection between a client device and a web server or it may be an indirect connection across a computer network (not depicted) in accordance with well-understood principles. It should be understood that browser may refer to a web browser or to any other type of program used to render and display markup files in a form suitable for viewing by humans. Further, a user agent may be any program executing on a computing device which may include any one of a variety of devices, such as personal computers, cell phones, smart phones, laptops, netbooks, tablets, tablet PCs, iPADs, and personal digital assistants (PDAs), among others.

A user agent (e.g., 10, 12, 14) may access data protected by a server by establishing a session between the user agent and the server. Client devices 21, 23, 25 may include any of a variety of devices, such as cell phones, smart phones, laptops, netbooks, tablets, tablet PCs, iPADs, and personal digital assistants (PDAs), among others. Thus, a client device may be a hardware system that executes a user agent and may include an operating system for hosting the user agent.

Further, a user agent may execute on a portable device, such as a mobile telephone, personal digital assistant (PDA), wireless email device, game console. A user agent may alternatively execute on a desktop or laptop personal computer (PC), a microcomputer, a workstation, a mainframe computer, a wired telephone, a television set top box, or any other information processing device which can benefit from the use of single sign-on techniques in accordance with the invention.

Further, the term "user" (also referred to herein as "client") should be understood to encompass, by way of example and without limitation, a person utilizing or otherwise associated with a client device. Thus, a user (e.g., 11, 13, 15) may be a person interacting with a client device (e.g., 21, 23, 25) such that the user uses the client device to communicate with a server (e.g., 16, 18)

A server (e.g., 16, 18) may be, for example, a remote application server such as a web site or other software program that is accessed by a user agent executing on a client device over a network using any one of the known communication protocol. A network, may comprise, for example, a global computer network such as the Internet, a wide area network (WAN), a local area network (LAN), a satellite network, a telephone or cable network, or various portions or combinations of these and other types of networks.

Thus, as illustrated in FIG. 1, user-1 11 interacts with client device 21 that executes a user agent 10 for communicating with a server. Similarly, user-2 13 interacts with client device 23 that executes a user agent 12 for communicating with a server. Similarly, user-n 15 interacts with client device 25 that executes a user agent 14 for communicating with a server.

It should be noted that a network environment described above herein may be a cloud computing system, and user agents and servers (e.g., web servers) may be part of a cloud computer system. Cloud computing is well understood in the art, and generally includes provisioning dynamically scalable and often virtualized resources as a service over the internet. Thus, in a cloud computing system, server may be a virtual server and actually reside over multiple physical servers. Similarly, in a cloud computing system, there may be multiple servers, and the multiple server may be virtual servers residing in a single physical server, or in multiple physical servers.

In at least one embodiment of the current technique, a verifier may be used to help securely authenticate the identity of a user agent. As used here, "authenticate" means to verify the identity of a user, and so "authenticate" and "verify" can be used interchangeably throughout. Also, although the specification will discuss, for simplicity, authentication of "users," it should be understood that "users" means any entity requiring authentication such as, for example, a person, animal, device, machine, or computer. A verifier can be any sort of device that implements the techniques described herein. Authentication can result in the performance of one or more actions including, without limitation, providing access or privileges, taking action, or enabling some combination of the two. Access includes, without limitation: access to a physical location, communications network, or a computer system; access to such services as financial services and records, or health services and records; or access to levels of information or services. It may be important to determine whether a device that is now attempting to access data of a web server during a session established between the device and the web server by providing a session token is same as the device that has been previously authenticated and for which the session token has been created.

Conventionally, a session token such as a HTTP cookie remains the primary identifier to track a device of a user. However, rising privacy concerns and new regulations are slowly weakening the effectiveness of the use of cookies. By contrast, in at least some implementations using the current technique described herein, a new method is provided to identify a device of a user via components of signature of the device of the user.

In at least one embodiment of the current technique, a server such as access manager server 20 may include an access control manager (which may be any web access management system, such as, for example, the RSA® Access Manager application produced by RSA Security, Inc. of Bedford, Mass. and EMC Corporation of Hopkinton, Mass.). It should be understood that in some embodiments (not depicted), a web server (e.g., 16, 18) and access manager server 20 may run on the same machine or separate machines which are connected over a network. Access manager server 20 connects to a web server (e.g., 16, 18) by way of a network connection. A network connection may be a direct connection between access manager server 20 and web server 16, 18 or it may be an indirect connection across a computer network (not depicted) in accordance with well-understood principles.

It should be noted that access manager server 20 depicted in FIG. 1 is optional and not required for validating association of a client device with a session. Further, it should be noted that in at least one embodiment of the current technique, association of a client device with a session may be validated by simply using a server (e.g. web server 16, 18) and a client (e.g. users 10, 12, 14).

Figure 2:
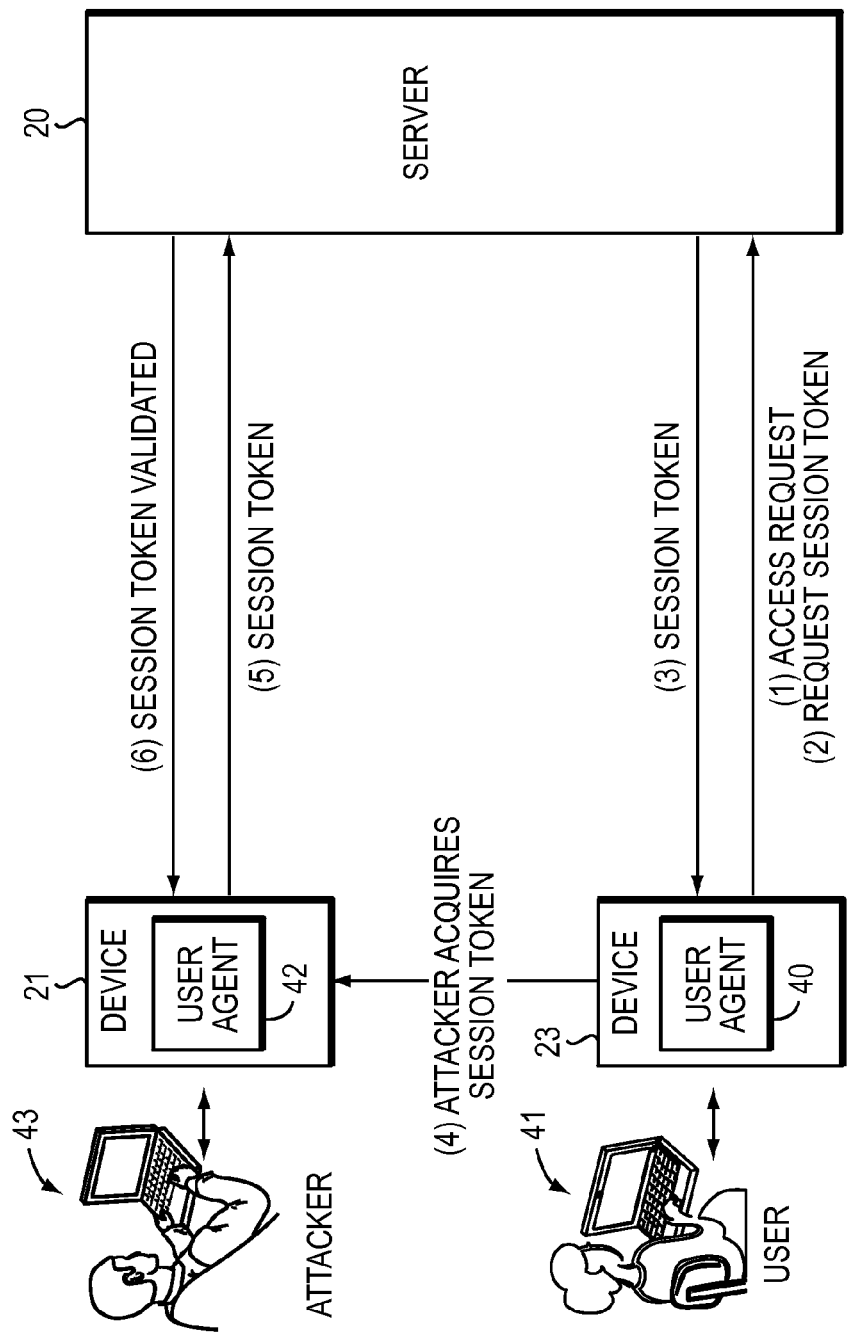
FIGS. 2-3 are block diagrams illustrating in more detail components that may be used in connection with techniques described herein.

FIG. 2 illustrates an example of a communication between a client and a server in a conventional system in which an attacker successfully obtains unauthorized access to the server by obtaining a cookie or a session token of an authorized user. A user agent 40 executing on a client device 23 attempts to access a resource protected by web server 20. The user 41 interacting with client device 23 executing user agent 40 is first authenticated using any one of the known authentication techniques. Conventionally, once the user 41 interacting with client device 23 executing the user agent 40 is authenticated, the user agent 40 requests a session token from the web server 20. In such a conventional system, the web server 20 generates a session token and provides the session token to the client device 23 executing the user agent 40. Further, in such a conventional system, the session token is provided to the client device 23 as a HTTP cookie. Further, in such a conventional system, an attacker 43 may obtain the session token provided to the client device 23 executing the user agent 40 via a security attack such as a cross-site scripting attack, hijacking links in emails, or a packet sniffing attack. Further, in such a conventional system, the attacker 43 may then provide the session cookie obtained from the client device 23 executing the user agent 40 to the web server 20 when sending a request to access a protected resource. Thus, in such a conventional system, a user agent executing on a client device used by the attacker 43 sends a request to web server 20 for validating the session token included in a cookie provided to the web server 20. In such a conventional system, the attacker 43 using the client device 21 which executes user agent 42 is able to successfully impersonate the user 41 using the client device 23 which executes the user agent 40 and is validated successfully by the web server 20 because in such a conventional system a session token is not associated with a specific user agent or a client device of the specific user agent. Thus, in such a conventional system, the web server 20 simply accepts a session token provided by the attacker 43 thereby allowing the attacker 43 to impersonate the user 41 successfully.

Thus, in at least one embodiment of the current technique as described herein, a session token is associated with a user agent when a session is established between a client (also referred to herein as "user") using a device that executes the user agent and a server by using identifying information (e.g., a device fingerprint) of the device associated with the user agent in such a way that the server may use the identifying information of the device in order to validate a session token provided by the user agent to the server during subsequent requests that are sent during the session. Thus, in at least one embodiment of the current technique, a device fingerprint is generated for a client device executing a user agent that sends an authentication request to a server and the device fingerprint is associated with a session token created for a user using the client device executing the user agent thereby enabling the session token to be uniquely associated with a specific client device. In at least one embodiment, initially, device fingerprint information of a client device is provided to a server when a session token is created for the client, generally, following authentication of the client such that the device fingerprint information is associated with the session token. Further, in at least one embodiment of the current technique, when a session token is subsequently provided to a server by a client device in a request during the session, device fingerprint information is again obtained from the client device and compared with device fingerprint information associated with the session token. In at least one embodiment, if device fingerprint information obtained from a client device providing a session token in a request during a session matches with device fingerprint information associated with the session token, a server accepts the session token indicating that the client providing the session token is same as the client for which the session token has been initially generated. However, if device fingerprint information obtained from a client device providing a session token in a request during a session to a server does not match with device fingerprint information associated with the session token, the session token is rejected by the server indicating that the client sending the request is not same as the client for which the session token has been created.

In at least one embodiment of the current technique, identifying information such as a device fingerprint of a client device is gathered from a header such as a HTTP header based on a communication protocol such as HTTP used by a client sending a request to a server using the client device. In at least one embodiment, a HTTP header may include information such as information about a client sending a request to a server. In at least one embodiment, device fingerprint information is gathered by a server when the server receives a request such as a HTTP request for accessing a resource that requires appropriate validation. The device fingerprint information may be provided to a web server as part of a request to establish a session between the client and the web server. Further, the web server again gathers device fingerprint information of a client device sending a request to the server with a session token during the session, and compares the device fingerprint information provided by the client device with device fingerprint information associated with the session token.

With reference also to FIG. 1, in at least one embodiment, a table such as a session table 32 may be created for tracking one or more sessions created between a client and a server. Further, in at least one embodiment, a table such as a user session table 30 may be created for associating the one or more sessions to a specific client. Session table 32 may include information such as a session identifier (also referred to as "session ID") for identifying a session created between a client and a server, token expiration information, session expiration information, and identifying information such as a device fingerprint. An entry is created in session table 32 when a session token is created for representing a session established between a client and a server. Thus, in at least one embodiment of the current technique, a session table may be used to maintain association between a session identifier and a client device. However, it should be noted that a session table is not required for managing an association between a session and a client device. It should be noted that a server may use any one of the known techniques for storing an association between a session and a client device.

Further, with reference also to FIG. 1, in at least one embodiment, user session table 30 may maintain an association between a user (also referred to herein as "client") and a session created by the user with a server. User session table 30 may include information such as a user identifier (also referred to herein as "user ID") for a user associated with a session, and a session identifier that identifies the session in session table 32. A user identifier and a session identifier uniquely identifies an entry in user session table 30. Thus, in at least one embodiment of the current technique, a user session table may be used to maintain association between a user and a session. However, it should be noted that a user session table is not required for managing an association between a session and a user. It should be noted that a server may use any one of the known techniques for storing an association between a session and a user.

In at least one embodiment, a session token includes information such as a session identifier that represents a session established between a server and a client, and identifying information such as a device fingerprint that identifies a client device used by the client. Further, a session identifier included in a session token may identify an entry in session table 32. In at least one embodiment of the current technique, a request from a client using a client device to a server may include information such as identification information (e.g., device fingerprint information) of the client device, and a session token.

In at least one embodiment of the current technique, a client may request an access to a resource on a server by attempting to establish a session between the client and the server. Further, the client may request a session token that may be used during the session established for accessing resources on the server. The server may first need to authenticate the client before establishing the session between the client and the server. In such a case, the server obtains identification information such as device fingerprint information for a client device used by the client. When the session is established between the client and the server, the client sends a session token generated for that client by the server via a client device in an access request. In order to validate the session token received from the client device, the server again obtains identifying information from the client device and computes device fingerprint from the identifying information received from the client device. The server then compares the computed device fingerprint with device fingerprint information included in the session token. If the computed device fingerprint does not match with the device fingerprint information included in the session token, the request is rejected indicating that the session token may have been obtained from the client by an attacker.

Figure 3:
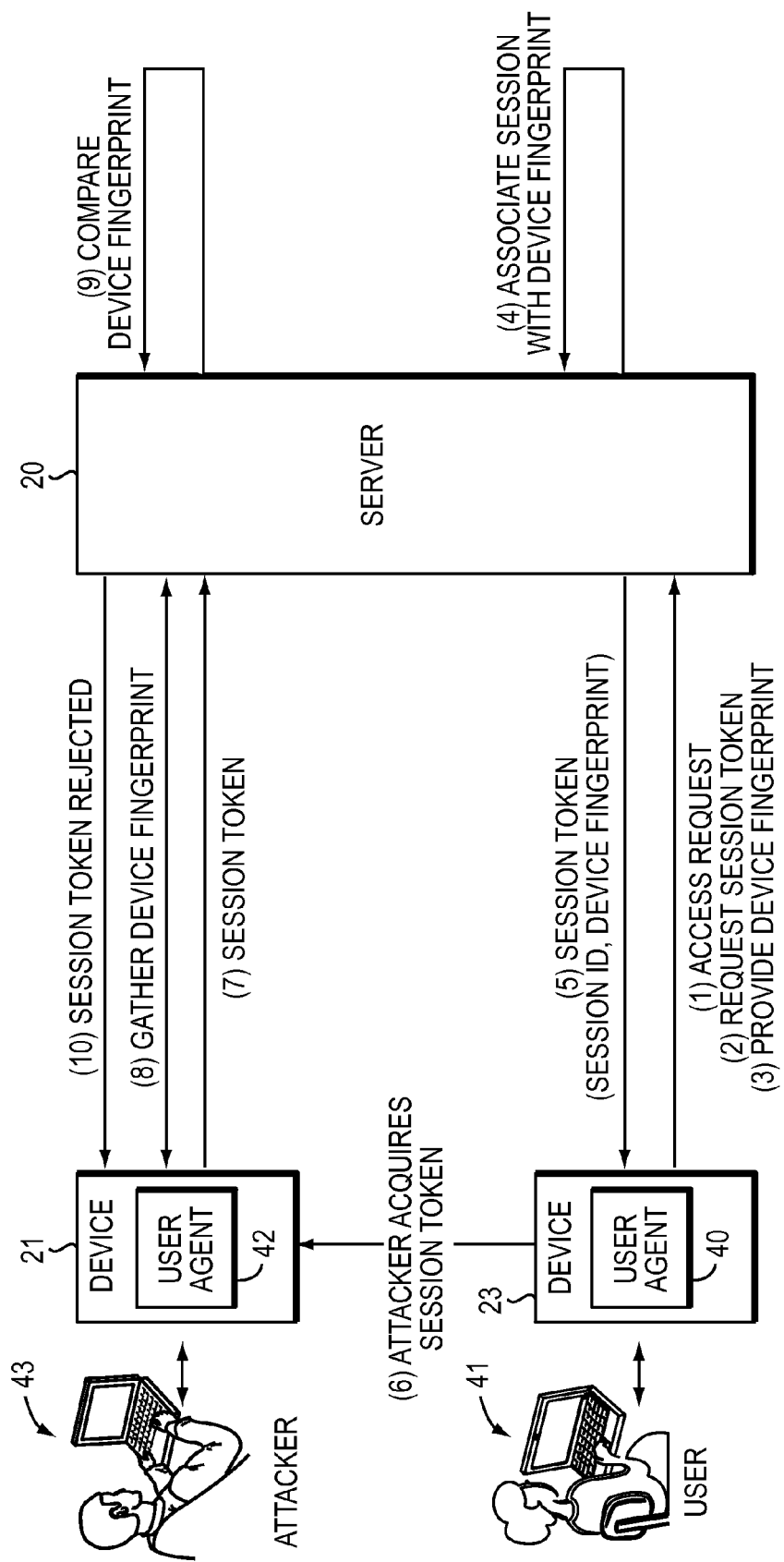

Referring to FIG. 3, shown is a more detailed representation of components that may be included in an embodiment using the techniques described herein. FIG. 3 illustrates an example of a session hijacking scenario where an attacker is prevented from assuming an identity of an authorized user using the current techniques described herein. In at least one embodiment of the current technique, a user 41 using a client device 23 which executes a user agent 40 attempts to access a resource of a server 20 such as a web server. The user 41 may be authenticated using any one of the known authentication techniques. Following authentication, the user 41 may request a session token from the server 20 via client device 23.

Further, the user agent 40 provides identification information such as device fingerprint information of client device 23 executing the user agent 40 to the server 20. Generally, a request immediately following authentication of user 41 may establish a session between the user 41 and server 20 and may be referred to as a logon request.

Further, with reference also to FIG. 1, in at least one embodiment of the current technique, a new entry may be created in the session table 32 indicating the new session established between the user 41 and the server 20. The new entry includes information such as a session identifier (ID), device fingerprint information derived from the identification information of client device 23 received from the user agent 40. Further, a new entry may be created in the user session table 30 and the new entry includes information such as a user identifier (ID), and the session ID of the new entry created in the session table 32. Thus, a session token is created and provided to the client device 23 executing the user agent 40 such that the session token may include information such as the session ID and the device fingerprint information.

Thus, the server 20 generates a session token and includes a session identifier and device fingerprint information in the session token. Further, server 20 associates the session token with the device fingerprint information provided by the user 41. Server 20 then provides the session token to the client device 23 executing the user agent 40 as a cookie such as a HTPP cookie.

In such an example as illustrated in FIG. 3, with reference also to FIG. 1, if an attacker 43 using a client device 21 which executes a user agent 42 obtains the session token created for user 41 (e.g., HTTP cookie) by any one of the known security attack techniques such as a cross-site scripting attack and using email links, the attacker 43 may then provide the session token to the web server 20 in an access request in order to access a resource of the server 20. The server 20 attempts to validate the session token and gathers device fingerprint information of device 21 used by the attacker 43 in the request for validating the session token. Such a validation request is referred to as an authorization request. In such an example using the current techniques described herein, the validation request received from the attacker 43 is rejected as the device fingerprint information obtained from the attacker does not match with device fingerprint information associated with the session token which may optionally be stored in the session table 32.

In at least one embodiment of the current technique, a unique user session may be established between a client and a server. In such a case, if an authenticated client attempts to access a resource on a server by using a client device executing a user agent which is different from the client device that has been used for authentication, the access request is rejected by the server because device fingerprint information of a client device associated with a session does not match device fingerprint information obtained from the different client device used by the client.

Figure 4:
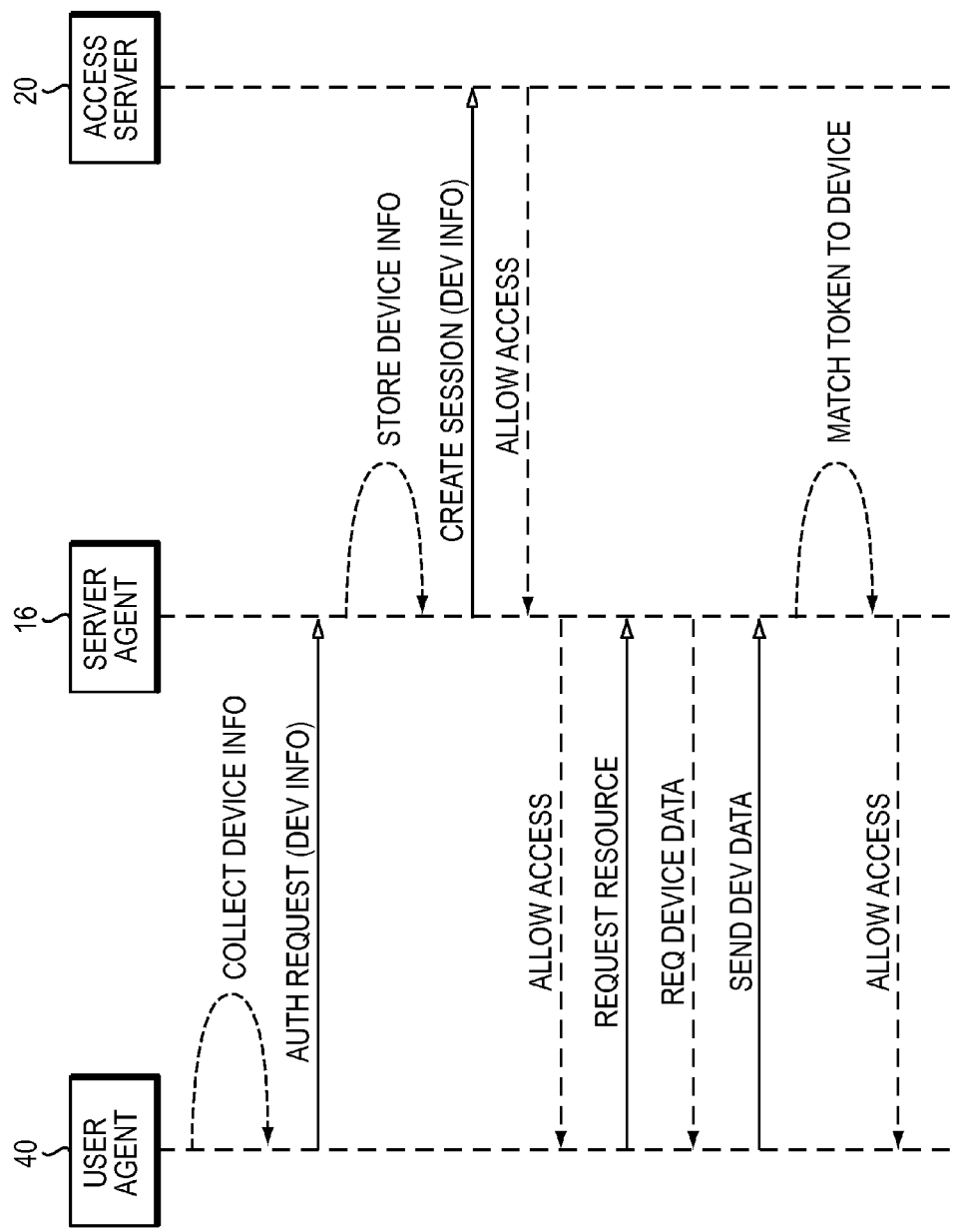
FIG. 4 is a sequence diagram illustrating processes that may be used in connection with techniques herein.

FIG. 4 illustrates a sequence for authorizing a client when a session is established by the client with a server and a session token is provided by the client to the server in subsequent requests during duration of the session. With reference also to FIGS. 1 and 3, in at least one embodiment of the current technique, a user using a client device executing user agent 40 sends an authorization request to server agent 16 such that the request includes information identifying the client device executing the user agent 40. The server agent 16 stores the information identifying the client device and sends a request to create a session with access server 20 in order to access a resource protected by the server 20 such that the request to create the session includes the information identifying the client device. The server 20 creates a session by creating a session token and associating the session token with the information identifying the client device. Thus, the user using the client device is authorized for accessing resources of the server 20 during duration of the session. Further, the client device is provided with the session token that includes the information identifying the client device. The client device executing the user agent 40 then sends a subsequent request to access a specific resource to server agent 16. The server agent 16 obtains information identifying a device executing the user agent 40 from the device. The server agent 16 then compares the information obtained from the device executing the user agent 40 with the information associated with the session token and upon finding the match between the information obtained from the device executing the user agent 40 and the information associated with the session token, allows access to the resource. It should be noted that identifying information may include a device fingerprint of a client device attempting to communicate with a server. Further, it should be noted that a client device may use any one of the known communication protocol for communicating with a server. Further, it should be noted that server agent 16 and server 20 may be a single server system that communicates with a client device.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in validating association of client devices with sessions, the method comprising:
    gathering information of a client device executing a user agent, by a server, for creating a device identifier for the client device upon receiving an authentication request from the user agent for establishing a session between the user agent and the server, wherein the device identifier includes information identifying the client device;
    associating the device identifier with a session token generated for the session, wherein the device identifier is included in the session token provided to the client device by the server;
    validating the client device each time the client device sends a subsequent request to the server for accessing a resource, by the server, during the session, wherein validating the client device includes receiving a session token from the client device, gathering information of the client device for creating another device identifier for the client device and comparing the other device identifier created from the information gathered during the subsequent request with the device identifier included in the session token;
    upon determining that the other device identifier matches with the device identifier included in the session token, accepting the session token for providing access to the resource; and
    upon determining that the other device identifier does not match with the device identifier included in the session token, rejecting the session token for providing access to the resource.

2. The method of claim 1, further comprising:
    associating the device identifier with a session identifier for the session, wherein the session identifier is generated for managing the session.

3. The method of claim 2, further comprising:
embedding the device identifier in the session identifier.

4. The method of claim 1, further comprising:
providing a session identifier to the client device, wherein the session identifier is generated for managing the session.

5. The method of claim 1, wherein each subsequent request received from the client device includes a session identifier.

6. The method of claim 1, wherein a session identifier includes a HTTP cookie.

7. The method of claim 1, wherein the client communicates with the server using a communication protocol, wherein the communication protocol includes HTTP protocol.

8. The method of claim 1, wherein the device identifier of a client device includes device fingerprint of the client device.

9. The method of claim 1, wherein a user agent includes a web browser.

10. A system for use in validating association of client devices with sessions, the system comprising a client device and a server configured to:
gather information of the client device executing a user agent, by the server, for creating a device identifier for the client device upon receiving an authentication request from the user agent for establishing a session between the user agent and the server, wherein the device identifier includes information identifying the client device;
associate the device identifier with a session token generated for the session, wherein the device identifier is included in the session token provided to the client device by the server;
validate the client device each time the client device sends a subsequent request to the server for accessing a resource, by the server, during the session, wherein validating the client device includes receiving a session token from the client device, gathering information of the client device for creating another device identifier for the client device and comparing the other device identifier created from the information gathered during the subsequent request with the device identifier included in the session token;
upon determining that the other device identifier matches with the device identifier included in the session token, accept the session token for providing access to the resource; and
upon determining that the other device identifier does not match with the device identifier included in the session token, reject the session token for providing access to the resource.

11. The system of claim 10, further comprising:
associate the device identifier with a session identifier for the session, wherein the session identifier is generated for managing the session.

12. The system of claim 11, further comprising:
embed the device identifier in the session identifier.

13. The system of claim 10, further comprising:
provide a session identifier to the client device, wherein the session identifier is generated for managing the session.

14. The system of claim 10, wherein each subsequent request received from the client device includes a session identifier.

15. The system of claim 10, wherein a session identifier includes a HTTP cookie.

16. The system of claim 10, wherein the client communicates with the server using a communication protocol, wherein the communication protocol includes HTTP protocol.

17. The system of claim 10, wherein the device identifier of a client device includes device fingerprint of the client device.

18. The system of claim 10, wherein a user agent includes a web browser.

* * * * *